United States Patent
Kori et al.

(10) Patent No.: US 8,994,245 B2
(45) Date of Patent: Mar. 31, 2015

(54) PERMANENT MAGNET TYPE ELECTRICAL ROTATING MACHINE AND PERMANENT MAGNET TYPE ELECTRICAL ROTATING MACHINE SYSTEM FOR VEHICLE

(75) Inventors: Daisuke Kori, Hitachinaka (JP); Akiyoshi Komura, Hitachi (JP); Masahiro Hori, Hitachiomiya (JP); Seikichi Masuda, Hitachi (JP); Masayasu Fujieda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 401 days.

(21) Appl. No.: 13/503,992

(22) PCT Filed: Oct. 26, 2009

(86) PCT No.: PCT/JP2009/005631
§ 371 (c)(1),
(2), (4) Date: May 18, 2012

(87) PCT Pub. No.: WO2011/051996
PCT Pub. Date: May 5, 2011

(65) Prior Publication Data
US 2012/0228990 A1    Sep. 13, 2012

(51) Int. Cl.
*H02K 5/00* (2006.01)
*H02K 7/00* (2006.01)
*H02K 5/173* (2006.01)
(Continued)

(52) U.S. Cl.
CPC ............... *H02K 7/003* (2013.01); *H02K 11/00* (2013.01); *H02K 5/1735* (2013.01); *H02K 7/085* (2013.01); *H02K 21/14* (2013.01)
USPC .............................. 310/273; 310/91; 310/113

(58) Field of Classification Search
USPC ........................................... 310/91, 113, 273
IPC ......................................................... H02K 5/00
See application file for complete search history.

(56) References Cited

U.S. PATENT DOCUMENTS 2,070,843 A * 2/1937 De Los Rice ................. 464/139
4,235,489 A * 11/1980 Schickling et al. ........... 384/539
(Continued)

FOREIGN PATENT DOCUMENTS

JP    62-9734 U    1/1987
JP    62-40035 A   2/1987
(Continued)

OTHER PUBLICATIONS

Yoshida, English translation of JP 2000-350416, Dec. 15, 2000.*
(Continued)

*Primary Examiner* — John K Kim
(74) *Attorney, Agent, or Firm* — Crowell & Moring LLP

(57) ABSTRACT

The permanent magnet type electrical rotating machine has an overhung rotor support structure in which a shaft of a rotor is supported at only one end side thereof by a bearing provided on one side of a casing of the electrical rotating machine. Another end side of the rotor shaft to be a bearing support-free side is capable of being joined to an end of a shaft of a prime mover via a flange formed at an end of the shaft. The rotor shaft is configured such that, upon a state of not being coupled to the prime mover shaft, the flange on the bearing support-free side is joined to an end face of the casing through a retaining member to be prevented from moving in any of an axial, radial and circumferential directions of the rotor shaft.

16 Claims, 12 Drawing Sheets

(51) Int. Cl.
*H02K 7/08* (2006.01)
*H02K 11/00* (2006.01)
*H02K 21/14* (2006.01)

(56) References Cited

U.S. PATENT DOCUMENTS

| | | | |
|---|---|---|---|
| 6,133,659 A * | 10/2000 | Rao | 310/89 |
| 2002/0101081 A1* | 8/2002 | Jockel | 290/8 |
| 2006/0103245 A1* | 5/2006 | Simofi-llyes et al. | 310/58 |
| 2009/0108604 A1* | 4/2009 | Camp et al. | 294/82.2 |
| 2012/0228990 A1* | 9/2012 | Kori et al. | 310/273 |

FOREIGN PATENT DOCUMENTS

| | | | |
|---|---|---|---|
| JP | 9-23624 A | | 1/1997 |
| JP | 2000350416 A | * | 12/2000 |
| JP | 2007-325426 A | | 12/2007 |
| JP | 2007-325449 A | | 12/2007 |

OTHER PUBLICATIONS

International Search Report including English language translation dated Dec. 22, 2009 (Four (4) pages).

* cited by examiner

PERMANENT MAGNET TYPE ELECTRICAL ROTATING MACHINE AND PERMANENT MAGNET TYPE ELECTRICAL ROTATING MACHINE SYSTEM FOR VEHICLE

TECHNICAL FIELD

The present invention relates to a permanent magnet type electrical rotating machine having an overhung rotor support structure in which a rotor shaft is supported at only one end side thereof by a bearing provided on one side of an electrical rotating machine casing and to a permanent magnet type electrical rotating machine system for vehicle, for example, for a rail vehicle, the system including the permanent magnet type electrical rotating machine.

BACKGROUND ART

Coil-wound generators and induction motors have been in use as rotary electrical rotating machines for rail vehicles. In recent years, however, high-performance permanent magnets have become available at low prices whereas high-performance inverters have come to be widely used, causing momentum to build up for using permanent magnet type electrical rotating machines which can realize weight reduction and efficiency enhancement.

Under the circumstances, to allow a generator for a rail vehicle to be installed in limited space available in the vehicle, a so-called overhung support structure (overhung rotor shaft support structure) used also as a bearing has been proposed in which no bearing is provided to support the rotor shaft of the generator on the side to be directly coupled to a prime mover and the rotor shaft portion provided with no bearing is left to be supported by a bearing provided for the prime mover.

Such an overhung rotor support structure of an electrical rotating machine (for example, a generator) is maintained until the rotor is directly coupled to a prime mover. The rotor of an existing type of a coil-wound generator is wound with a coil which, when an electric current is made to flow therethrough, makes the rotor an electric magnet. Unless an electric current is applied to the rotor, no magnetic flux is generated in the generator, so that no magnetic attractive force is generated. On the other hand, when a permanent magnet type generator is used with the rotor having a permanent magnet, a magnetic flux is always present in the generator causing a magnetic attractive force to be generated between the rotor and the stator. Therefore, it is feared that the rotor affected by such a magnetic attractive force may move to possibly come into contact with the stator. Hence, a generator structure which can prevent an overhung rotor from moving until the rotor is directly coupled to a prime mover is required. Also, when performing maintenance on the prime mover and the generator, it is necessary to decouple them, so that a generator structure which can prevent the rotor from moving during maintenance is required too.

When a rotary electric machine such as a generator has an overhung rotor, it is necessary to fix the rotor not to allow the rotor to move until it is directly coupled to a prime mover. Hence various types of rotary electric machine structures in which a rotor can be fixed as described in the following patent to literature are being considered.

CITATION LIST

Patent Literature

[PTL 1]
Japanese Patent Application Publication No. 2007-325449

[PTL 2]
Japanese Patent Application Publication No. 2007-325426

[PTL 3]S
Japanese Patent Application Publication No. 1987-040035

SUMMARY OF INVENTION

Technical Problem

With regard to a transportation protector for protecting an overhung rotor type electric motor applied, for example, to an elevator winch, the patent literatures 1 and 2 discloses about techniques for preventing a rotor shaft from moving in either of the radial and axial directions of the rotor. In the techniques, a pair of fixing plates is screwed to an end face of a flange portion formed at an end of the electric motor, and the rotor shaft of the electric motor is caught by the fixing plates on the bearing support-free side where the rotor shaft is supported by no bearing, thereby preventing a rotor shaft from moving in either of the radial and axial directions of the rotor. To be more specific, in the technique disclosed in the patent literature 1, the fixing plates are fixed to a flange end face of an electric motor casing by engagement of projections and depressions provided on the two, and an one end portion of each fixing plate engages a shelf portion formed on the outer periphery of the rotor shaft, thereby preventing the rotor from moving in either of the radial and axial directions. In the technique disclosed in the patent literature 2, the fixing plates have U-shaped portions respectively at each one end thereof, and the rotor shaft is caught by the U-shaped portion, thereby preventing the rotor from moving in either of the radial and axial directions.

The above rotor catching structure may be effective as means for protection during transportation for electrical rotating machines, for example, elevator which is relatively small compared with generators for rail vehicle. However, the structure may not be effective when they are to be applied to generators for rail vehicles, particularly, permanent magnet type electrical rotating machines on the order of several megawatts having an overhung rotor support structure. The reasons why are as follows. Namely, in the case of a permanent magnet type electrical rotating machine on the order of several megawatts, the internal magnetic attractive force present in the electrical rotating machine is very large, so that, when the electrical rotating machine is subjected to an external force in the rotational direction thereof before being directly coupled to a prime mover, the rotor may not be reliably prevented from moving in the rotational direction thereof.

If, as feared above, the rotor is displaced in the rotational direction thereof, it becomes difficult to perform positioning, between the rotor shaft of the electrical rotating machine having an overhung rotor support structure and the shaft of the prime mover, in the circumferential direction, when coupling the rotor to, for example, a prime mover. This is expected to deteriorate the assemblability and maintainability of the electrical rotating machine.

Another existing technique is described in the patent literature 3. In the technique, a spacer is provided between a rotor and a stator to prevent them from coming into contact with each other such that, after the rotary machine is assembled, the spacer can be removed. In this structure aimed at preventing the rotor and the stator from coming into contact with each other, the rotor itself is not fixed. Therefore, the technique is not good enough to prevent an overhung rotor from moving in the rotational direction (circumferential direction) thereof. Also, removing the spacer is relatively troublesome, and once the spacer is removed, it cannot be easily reattached. Therefore, this technique requires consideration as to assemblability and maintainability.

The present invention has been made in view of the above circumstances and an object of the present invention is to provide a permanent magnet type electrical rotating machine which realizes a rotor retaining structure for securely preventing the rotor before being coupled to a prime mover from moving in any of not only the axial and radial but also rotational (circumferential) directions, even in a case where it is a large capacity (with a large magnetic attractive force) permanent magnet type electrical rotating machine having an overhung rotor support structure.

Solution to Problem

To achieve the above object, the present invention provides, basically, a permanent magnet type electrical rotating machine having an overhung rotor support structure, in which only one end side of a rotor shaft is supported by a bearing provided on one side of the casing of the electrical rotating machine, and in which another end side of the rotor shaft to be a bearing support-free side is capable of coupling to a shaft of a prime mover shaft. The permanent magnet type electrical rotating machine has the following feature.

The rotor shaft may be configured such that, upon a state of not being coupled to the prime mover shaft, the bearing support-free side is joined to an end face of the casing through a retaining member to be prevented from moving in any of an axial, radial and circumferential directions of the rotor shaft.

Preferred modes of carrying out the present invention are examplied as follows.

One end side of the retaining member may be joined to an end face of the rotor shaft, on the bearing support-free side, with a screw member, and another end side of the retaining member may be joined to the end face of the casing with a screw member.

For example, the rotor shaft may be provided with a flange portion which is integrally formed with the rotor shaft at an end portion of the rotor shaft on the bearing support-free side to be used for coupling the rotor shaft directly to the prime mover shaft; wherein one end side of the retaining member is joined to an end face of the flange with a screw member, and another end side of the retaining member is joined to the end face of the casing with a screw member.

Also, the rotor shaft may be provided with a first flange portion and a second flange portion on the bearing support-free side; wherein the first flange portion is formed at an end of the rotor shaft to be used for coupling the rotor shaft directly to the prime mover shaft, and the second flange portion is formed for joining to the retaining member; and one end side of the retaining member is joined to an end face of the second flange portion with a screw member, and another end side of the retaining member is joined to the end face of the casing with a screw member.

The invention of the present application is not limited to the foregoing modes, and various other concrete modes can be considered as being described as embodiments of the invention in the following.

According to the present invention, even for a large capacity (with a large magnetic attractive force) permanent magnet type electrical rotating machine having an overhung rotor support structure, a rotor retaining structure can be provided, which has superior electrical rotating machine protection capability for securely preventing the rotor before being coupled to a prime mover from moving in any of not only the axial and radial but also rotational (circumferential) directions. In addition, the rotor retaining structure allows retaining members to be joined thereto and removed therefrom with ease, so that the permanent magnet type electrical rotating machine according to the present invention can contribute toward simplifying assembly and maintenance of the electrical rotating machine.

BRIEF DESCRIPTION OF DRAWINGS

FIG. 4 is a top view of the L-shaped metal part 12a.

DESCRIPTION OF EMBODIMENTS

Figure 1:
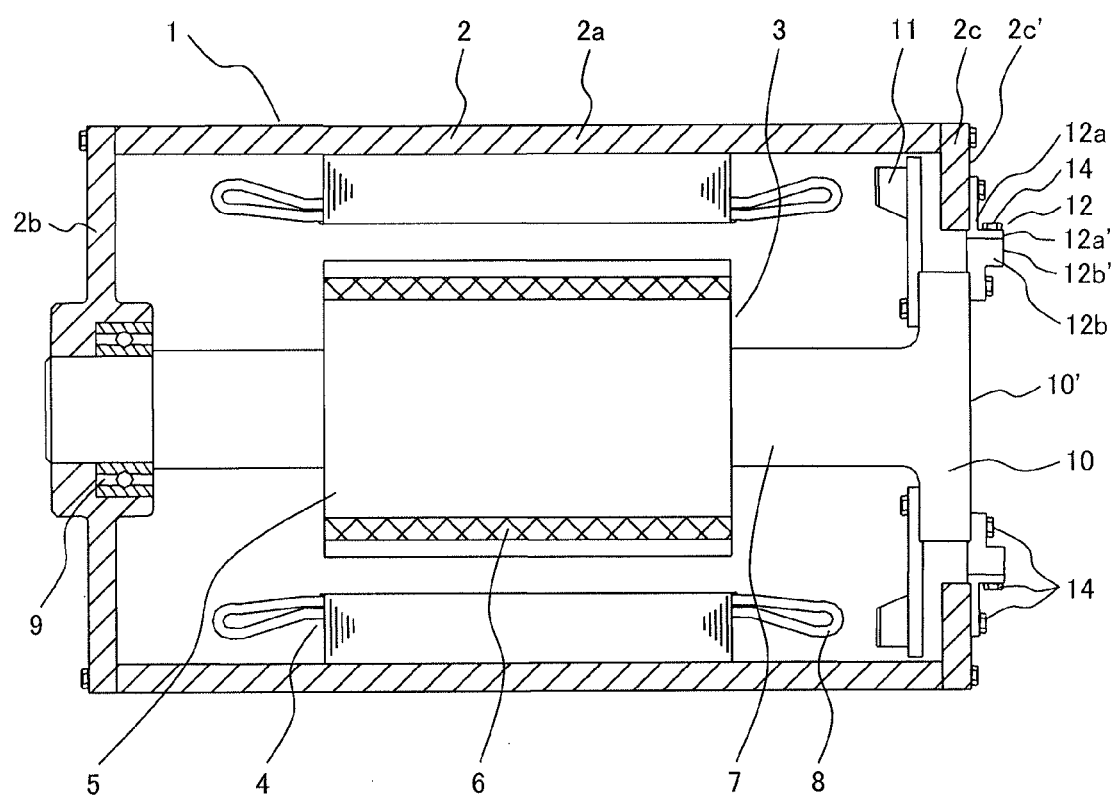
FIG. 1 is an axial sectional view of a permanent magnet type generator for vehicle according to a first embodiment of the present invention.

Concrete aspects of the present invention will be described below by way of exemplary embodiments with reference to corresponding drawings. In the drawings, identical parts are denoted by identical reference numerals.

First Embodiment

FIG. 1 is an axial sectional view of a permanent magnet type generator for vehicle according to a first embodiment of the present invention. The permanent magnet type generator is used as a generator for rail vehicle on the order of several megawatts and rotates at a rate of 600 to 2500 min$^{-1}$.

A rotor 3 and a stator 4 are installed in an generator casing 2. The rotor 3 has a rotor core 5 in which a permanent magnet 6 to be a field pole is buried. The rotor core 5 and a rotor shaft 7 are joined to each other.

The stator 4 has a stator coil 8 for taking out power excited by rotation of the rotor.

The generator casing 2 is comprised of a cylindrical yoke (cylindrical frame) 2a, an end bracket 2b having an internal bearing and being provided at one end of the cylindrical yoke, and an open bracket 2c provided at the other end of the cylindrical yoke.

In the generator, the bracket 2c side as one end side of the casing is used for coupling to a prime mover 101 (illustrated in FIGS. 11 and 12), and the generator itself is provided with no bearing at the one side of the casing as a prime mover coupling-side. Namely, the generator of the present embodiment has an overhung support structure in which the shaft of the rotor 3 is supported, at only one end side thereof, by a bearing 9 provided on one side (end bracket) 2b of the rotor 3. Another end side of the shaft to be a bearing support-free side thereof, which is not supported by the bearing 9, is capable of coupling to an end of a shaft of the prime mover.

On the side to be coupled to the output shaft of the prime mover, the rotor shaft 7 extends such that its end is flush with an end face (i.e. an outer end face 2c' of the end bracket 2c) of the casing. The shaft has a flange portion 10 formed at the end. The end to be coupled to the prime mover of the flange portion 10 is also flush with the outer end face 2c' of the casing. The state expressed by "flush with" is inclusive of minor alignment errors resulting from part dimensional errors or assembly dimensional errors.

In the flange portion 10, the other end face opposite to the one end face to be coupled with the prime mover, is provided with a fan 11 for cooling the generator.

The shaft 7 of the rotor 3 is configured such that, upon a state of not being coupled to an output shaft 10 of the prime mover shaft, the bearing support-free side (namely the one end face 10' of the prime mover coupling-side of the flange 10 in this embodiment) not supported by the bearing 9 is joined to the end face 2c' (the end face of the bracket) of the casing through a plurality of retaining members 12, so the rotor shaft 7 is prevented from moving in any of an axial, radial and circumferential directions of the rotor shaft upon non-coupling to the prime mover shaft.

The retaining members 12 can be of various types. In the present embodiment, each retaining member 12 comprises a pair of L-shaped metal parts 12a and 12b, which are joined with each other by screw members 14 while face-to-face sides 12a' and 12b' of the L-shaped metal parts 12a and 12b are butt-joined with the screw member 14. The L-shaped metal parts 12a and 12b are joined to both of the bearing support-free side of the rotor shaft 7 (i.e., in the present embodiment, the flange end face 10') and the end face 2c' of the casing with screw members (i.e., in the present embodiment, bolts) 14. The face-to-face sides of the pair of L-shaped metal parts 12a and 12b are provided with respective bolt through-holes (through-holes for screw member), and the through-hole 121 of the face-to-face side 12a' in either of the pair of the L-shaped metal parts is provided with play to allow the pair of the L-shaped metal parts to be shifted relative to each other in the axial direction of the rotor. In this configuration with the sides 12a' and 12b' of each pair of L-shaped metal parts 12a and 12b being shiftable relative to each other when the sides 12a' and 12b' are butt-joined, even if misalignment is caused by an assembly dimensional error (for example, between the rotor shaft 7 and the casing 2) or a part dimensional error in the axial direction of the rotor 3 between the end face (flange end face 10') of the shaft 7 of the rotor 3 and the casing end face 2c' to both of which the L-shaped metal parts are to be joined, the misalignment can be absorbed.

Figure 2:
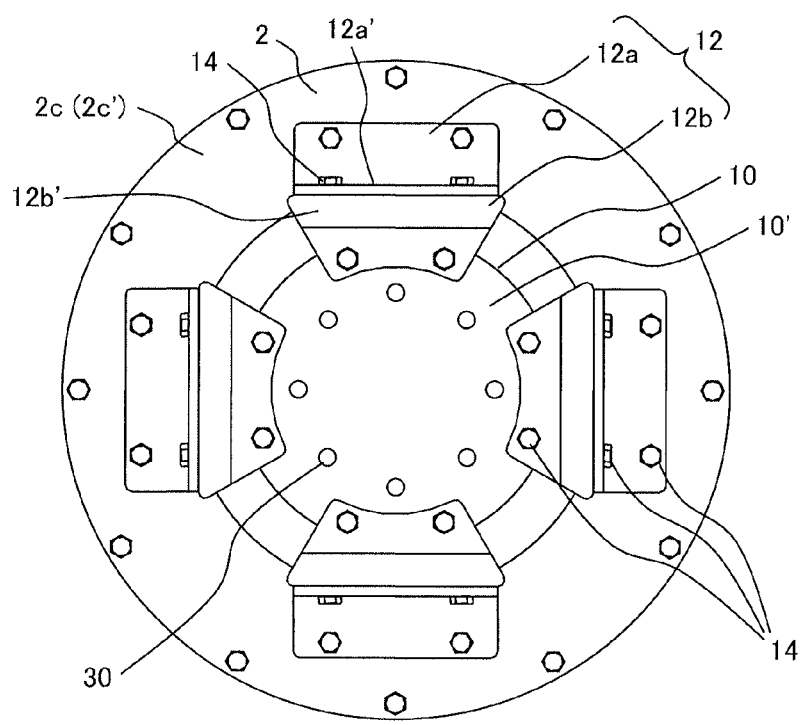
FIG. 2 is a right side view of the permanent magnet type generator for vehicle shown in FIG. 1.
Figure 3:
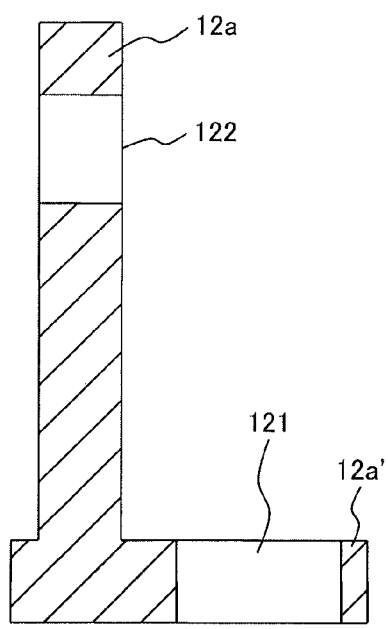
FIG. 3 is a sectional view of an L-shaped metal part 12a used in the first embodiment.
Figure 4:
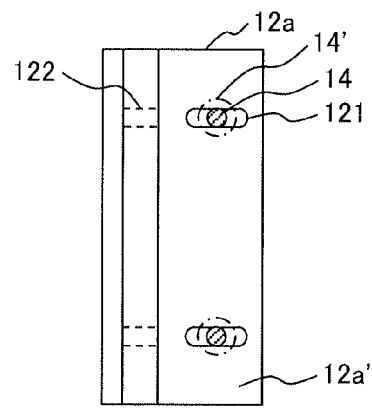

For example, each of the bolt through-holes 121 of each L-shaped metal part 12a is, as illustrated in FIGS. 3 and 4, elongated in the axial direction of the rotor making the hole diameter in the elongated direction larger than the diameter of each bolt 14, thereby providing each bolt through-hole 121 with a dimensional allowance in the rotor axial direction. A illustrated in line in FIG. 4, each bolt 14 has a head 14' having a diameter larger than the width in a direction of not being elongated direction of the bolt-through hole 121. The bolt through-holes 121 may have, instead of being elongated, a diameter larger than the bolt diameter to secure a dimensional allowance (not illustrated). Even though, in the present embodiment, four pairs of L-shaped metal parts 12 are, as illustrated in FIG. 2, evenly arranged along the periphery of an opening on one side of the casing 2, a different number of pairs of L-shaped metal parts 12 may be arranged differently. In FIG. 3, reference numeral 122 denotes a bolt through-hole for a bolt 14 which is used to secure the L-shaped metal part 12a to the casing end face 2c'.

Figure 5:
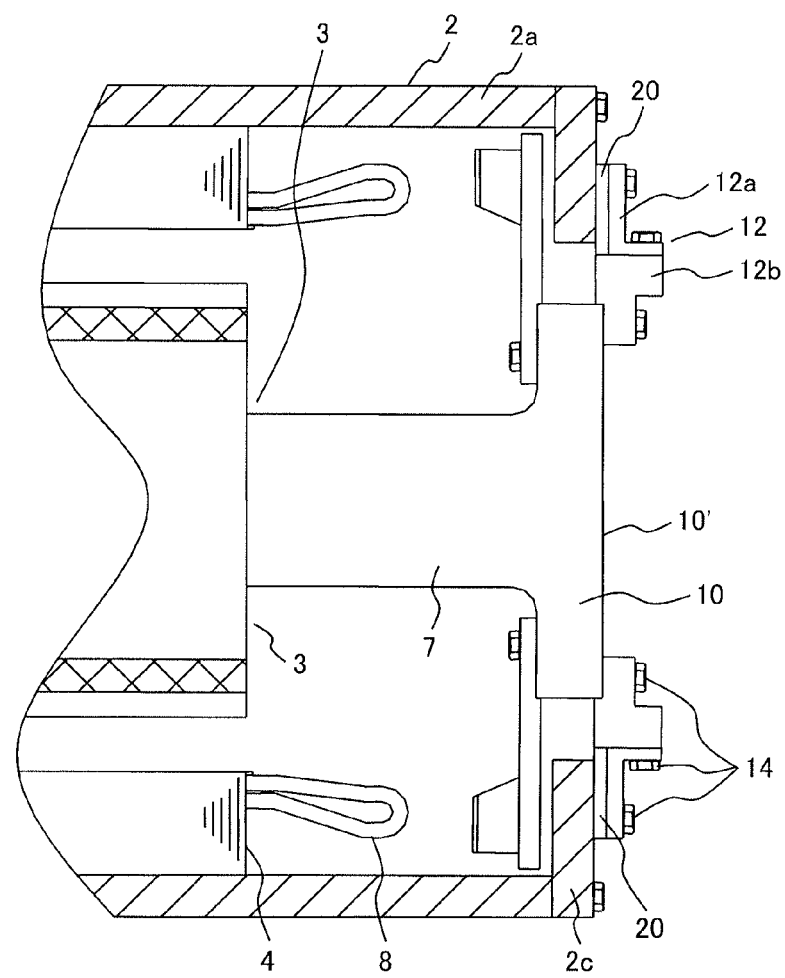
FIG. 5 is an axial partial sectional view of another aspect of the first embodiment.
Figure 8:
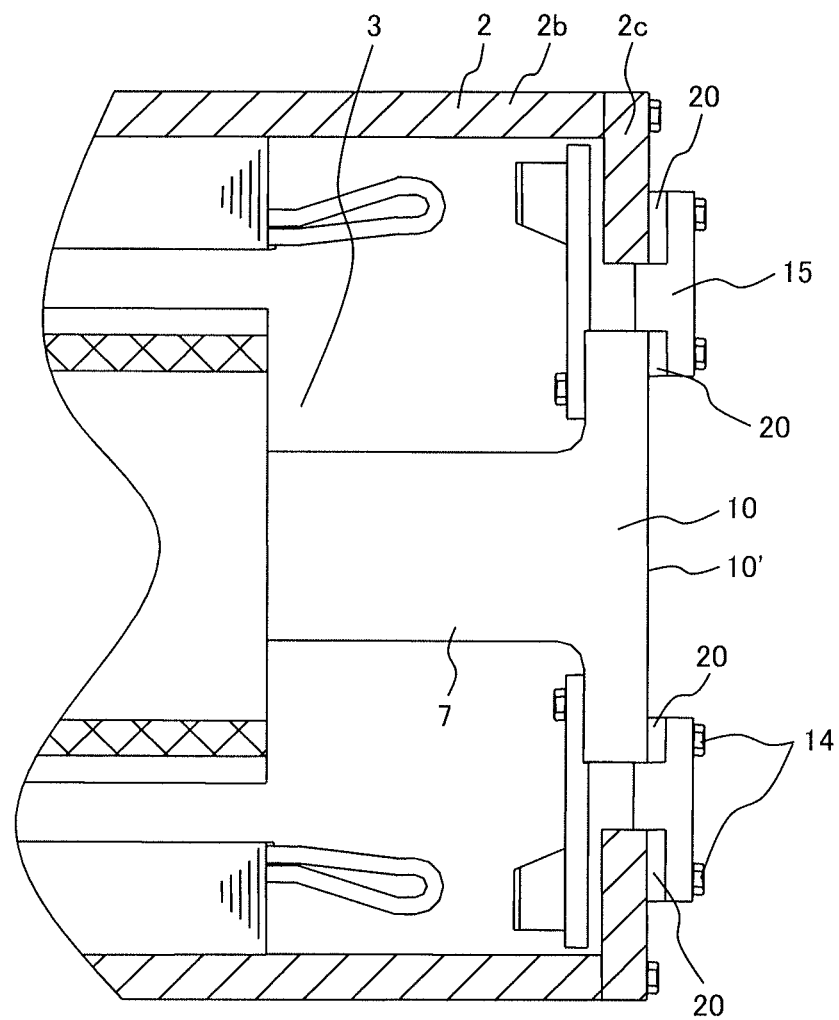
FIG. 8 is an axial partial sectional view of another aspect of the second embodiment.

An alternative configuration may be proposed as follows. As illustrated in FIG. 5, when an assembly dimensional error or part dimensional error in the axial direction is present between the rotor shaft 7 and the casing 2 resulting in misalignment in the axial direction between the flange end face 10' of the rotor 3 and the casing end face 2c', as illustrated in FIG. 8, the misalignment can be absorbed by interposing spacers 20 between the flange end face 10' and the casing end face 2c'.

Referring to FIG. 2, the flange end face 10' at an end of the rotor shaft 7 is provided with tapped holes (in FIG. 2, covered by the L-shaped metal parts 12b) used for screwing one end side of each L-shaped metal part (retaining member) 12 (12b) along with plural tapped holes 30 used for coupling the flange 10 of the rotor shaft 7 to the output shaft of the prime mover using bolts 14.

According to the present embodiment, even in a state in which a magnetic attractive force is applied between the rotor 3 and the stator 4 resulting in an external force being applied to the rotor 3, the rotor 3 can be prevented from moving in any of the axial, radial and circumferential (rotational) directions. This prevents the rotor 3 from moving to be damaged during transportation of the generator 1 before being coupled to the prime mover 101. Furthermore, the rotor 3 since is prevented from rotating during work for coupling the generator 1 and the prime mover 101, the generator 1 and the prime mover 101 can be positioned for coupling with ease to achieve improved workability. Still furthermore, even when doing maintenance after the generator 1 and the prime mover 101 are coupled together, the generator 1 since is configured such that the L-shaped metal parts (retaining members) 12 can be joined thereto to prevent the rotor 3 from moving, it is possible to improve the maintainability of the generator 1 (as described below with reference to FIG. 12).

Figure 12:
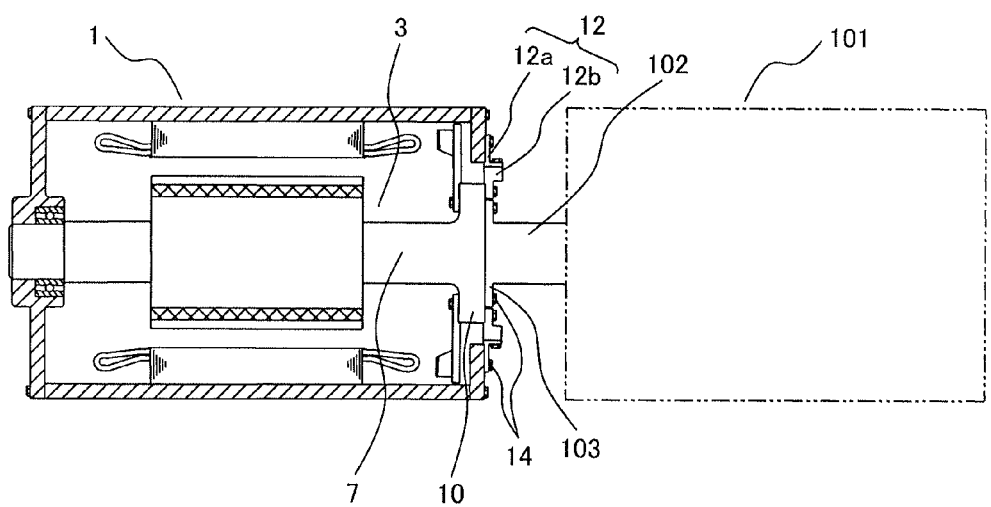
FIG. 12 is a diagram illustrating the permanent magnet type generator for vehicle according to the first embodiment in a process of being coupled to a prime mover.

FIG. 12 is a diagram showing the permanent magnet type generator 1 of the present embodiment in a state of being coupled to the prime mover 101. The prime mover 101 may be, for example, an electric motor or an internal combustion engine (for example, a diesel engine). As shown in FIG. 12, the flange portion 10 of the overhung rotor shaft 7 of the generator 1 is directly coupled to a flange 103 included in the output shaft 102 of the prime mover 101.

Figure 13:
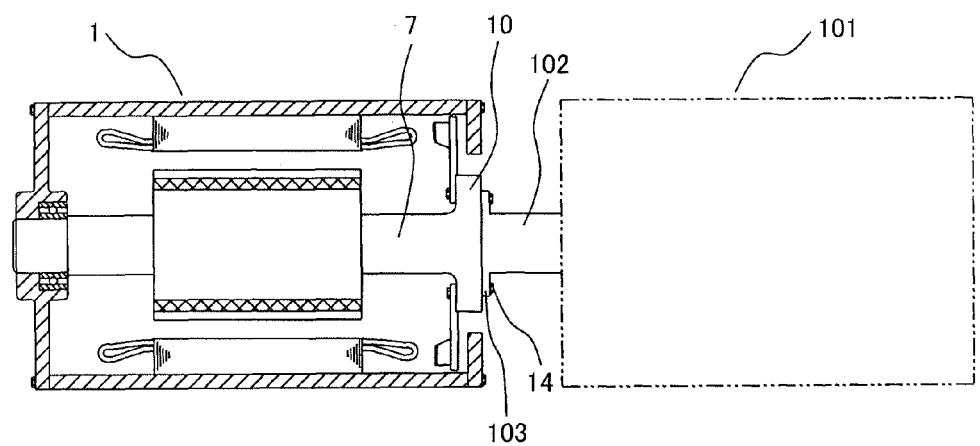
FIG. 13 is a diagram illustrating the permanent magnet type generator for vehicle according to the first embodiment in a state having been coupled to a prime mover.

FIG. 12 shows a state that the shafts 7 of the generator 1 and the shaft 102 of the prime mover 101 are coupled together via the flanges 10 and 103 in a state immediately before the L-shaped metal parts 12 (12a and 12b) for retaining the rotor 3 are removed therefrom. In this configuration, the retaining members (L-shaped metal parts 12a and 12b) can be attached to or removed from the generator 1 coupled to the prime mover 101, so that maintainability of the generator 1 can be improved. FIG. 13 shows the generator 1 and the prime mover 101 in a state with the L-shaped metal parts 12a and 12b removed after the generator 1 and the prime mover 101 are, as shown in FIG. 12, coupled together using the bolts 14 via the flange portion 10 of the rotor shaft 7 and the flange 103 of the prime mover output shaft 102. In the state shown in FIG. 13, the portion on the side provided with no bearing of the rotor shaft 7 in the generator, is supported by a bearing provided for the output shaft 102 of the prime mover to which the rotor shaft 7 is directly coupled.

Second Embodiment

Figure 6:
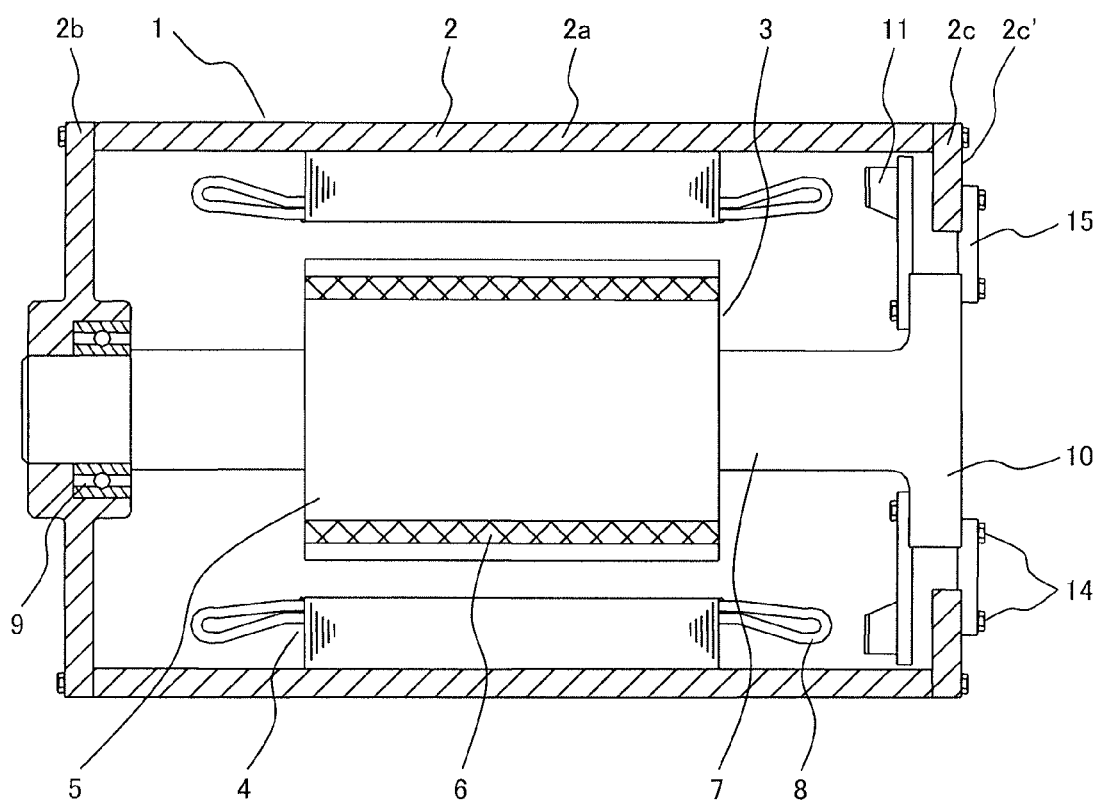
FIG. 6 is an axial sectional view of a permanent magnet type generator for vehicle according to a second embodiment of the present invention.
Figure 7:
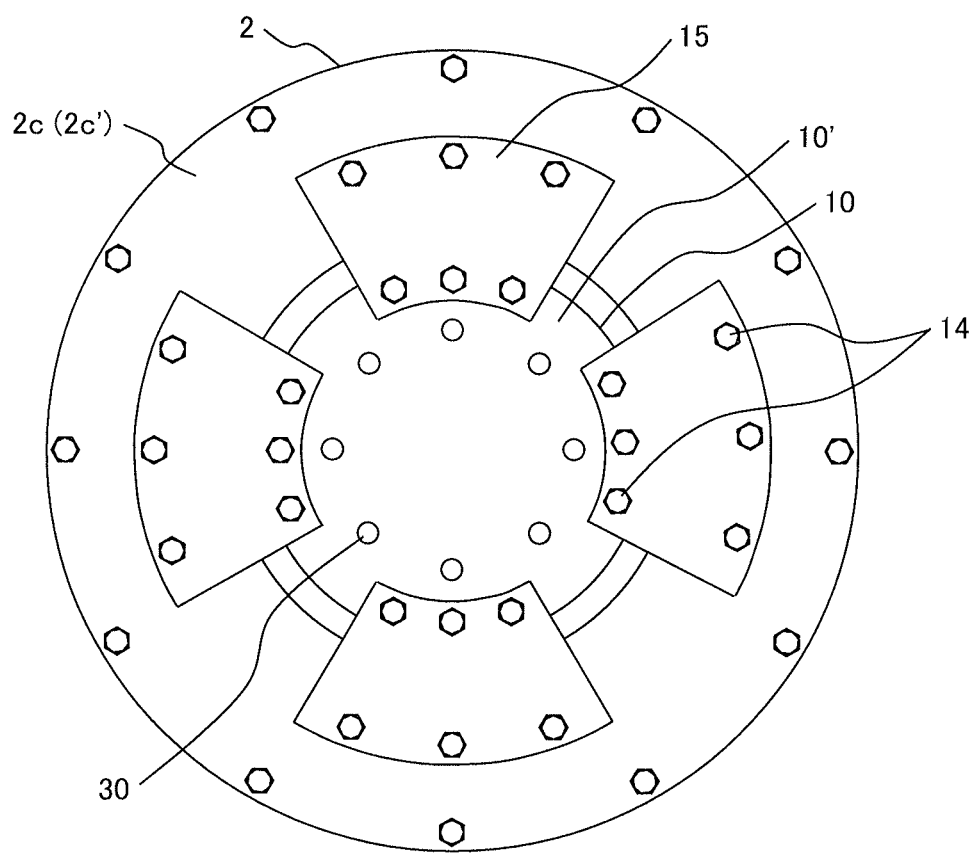
FIG. 7 is a right side view of the permanent magnet type generator for vehicle shown in FIG. 6.

FIG. 6 is an axial sectional view of a permanent magnet type generator for vehicle according to a second embodiment of the present invention, and FIG. 7 is a right side view (a side view as seen from the side where the shaft is supported by no bearing) of the same.

The present embodiment differs from the first embodiment in that plate-shaped metal parts 15 are used as rotor shaft retaining members for joining between the end face 2c' of the generator casing 2 and the flange end face 10' of the rotor shaft 7 instead of the L-shaped metal parts 12a and 12b used in the first embodiment. Like in the first embodiment, in the present embodiment too, spacers 20 (see FIG. 8) may be used to absorb misalignment in the axial direction caused by an assembly dimensional error between the rotor shaft and the casing both included in the generator. Such a configuration makes it possible to prevent the rotor 3 from moving in any of the axial, radial and circumferential (rotational) directions in a state with a magnetic attractive force applied between the rotor 3 and the stator 4, while also allowing the number of components of the generator to be minimized. Thus, the present embodiment is as effective as the first embodiment.

Third Embodiment

Figure 9:
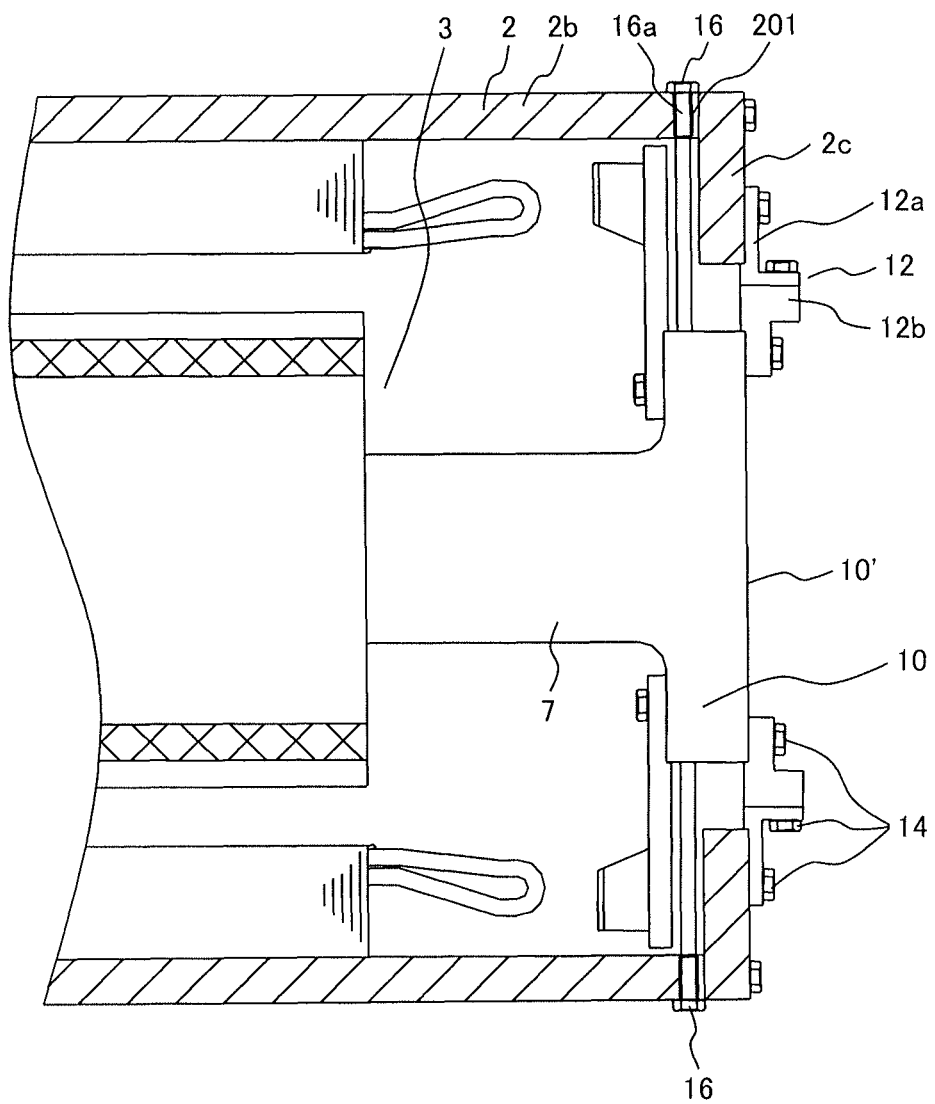
FIG. 9 is an axial partial sectional view of a permanent magnet type generator for vehicle according to a third embodiment of the present invention.

FIG. 9 is an axial sectional view of a permanent magnet type generator for vehicle according to a third embodiment of the present invention. The configuration of the present embodiment is equivalent to the generator configuration of the first embodiment additionally including the following arrangement.

Figure 10:
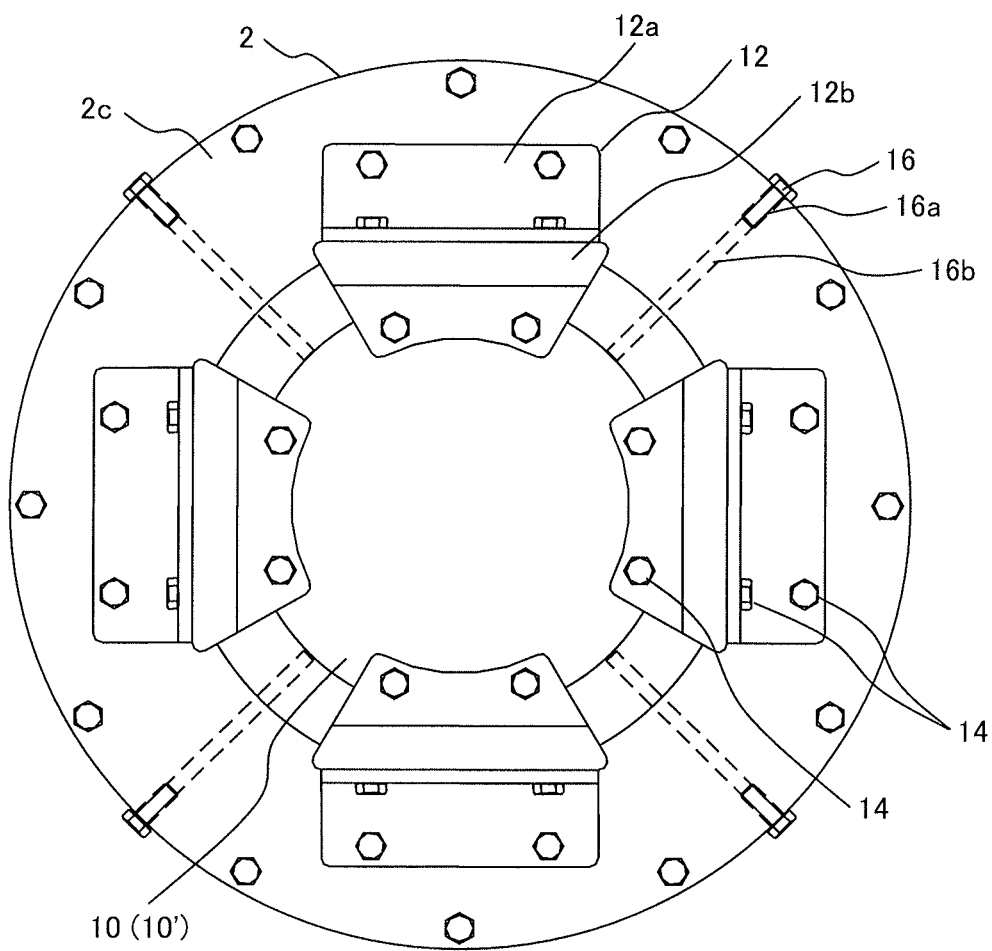
FIG. 10 is a right side view of the permanent magnet type generator for vehicle shown in FIG. 9.

Namely, the present embodiment includes, additionally to the configuration of the first embodiment, such an arrangement that a plurality of shaft retaining rods 16 each having a male thread 16a are inserted from an outer periphery of the generator casing 2 toward the rotor shaft on the bearing support-free side not supported by the bearing 9 through tapped holes 201 formed in the casing 2. The shaft retaining rods 16 retain the rotary shaft (i.e., in the present embodiment, an outer peripheral portion of the flange portion 10) while catching the rotor shaft together, so that a supplemental restraint for the rotor 3 is made in any of radial, axial, and circumferential directions of the rotor shaft. The shaft retaining rods 16 are, for example, shaped like bolts each having a male-threaded portion 16a corresponding to each of the tapped holes 201 and are each screwed through one of the tapped holes 201 until the end of each rod comes into contact with the outer peripheral surface of the flange portion 10. FIG. 10 is a right side view of the generator of the present embodiment. As shown in FIG. 10, four shaft retaining rods 16 are arranged to make up two pairs with each pair of rods opposing each other. Even though, in the example shown in FIG. 10, the rods 16 total four, more pairs of rods 16 may be used as long as they are arranged such that each pair of rods oppose each other. In this configuration, even when the bolts 14 fixing the retaining members 12 (for example, L-shaped metal parts or plate-like metal parts) are deformed or broken, the shaft retaining rods 16 can prevent the rotor 3 from moving in either the axial direction or the radial direction. The rods 16 can also prevent the rotor 3 and the stator 4 from being caused, by a magnetic attractive force, to come into contact with each other. Furthermore, since the rotor 3 can be prevented without using the retaining members 12 from moving, when coupling the generator 1 to the prime mover 101, the rotor position can be finely adjusted in the radial direction by adjusting the depths to which the rods 16 are screwed in. This can improve centering accuracy of the rotor 3. The configuration of the third embodiment can also be applied to the second embodiment to achieve the same effects.

Fourth Embodiment

Figure 11:
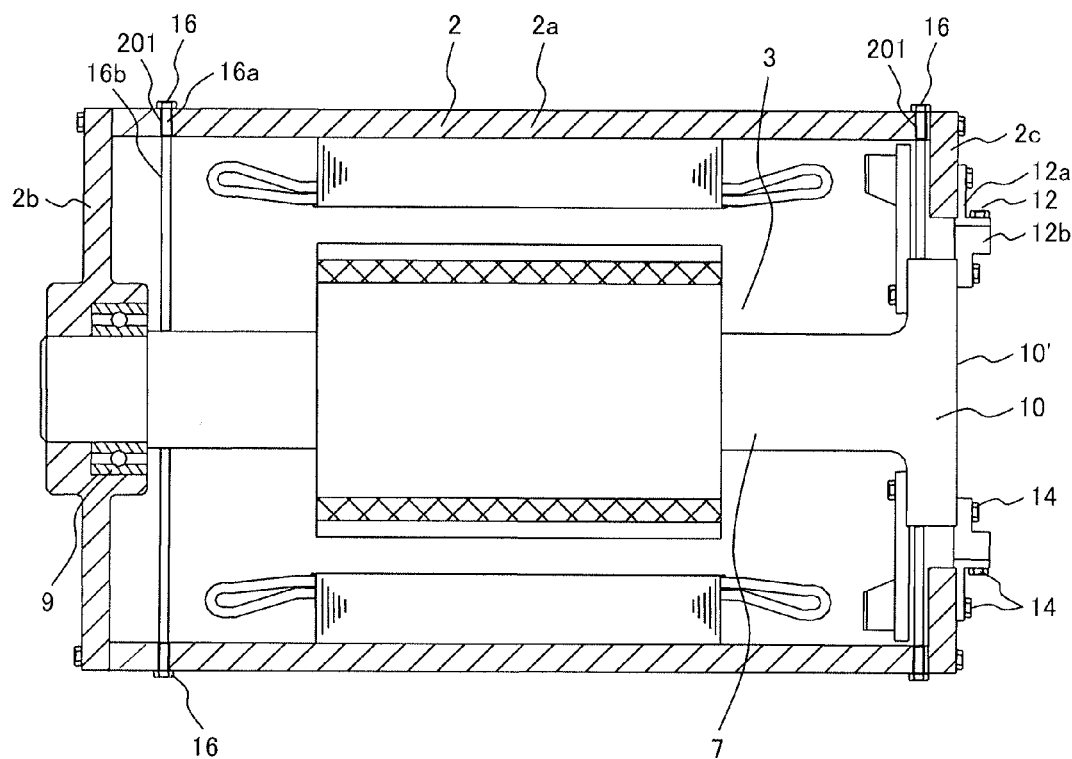
FIG. 11 is an axial partial sectional view of a permanent magnet type generator for vehicle according to a fourth embodiment of the present invention.

FIG. 11 is an axial sectional view of a permanent magnet generator for vehicle according to a fourth embodiment of the present invention.

The configuration of the present embodiment is equivalent to the generator of the third embodiment additionally including shaft retaining rods 16 screwed through the outer periphery of the generator casing 2 on the side opposite to the side where the prime mover is coupled. The rods 16 are screwed to depths where they come into contact with the rotor shaft 7. The circumferential positions of the rods 16 on the generator casing are the same as those shown in connection with the third embodiment. In this configuration with the rods 16 provided also on the side opposite to the side where the prime mover is coupled, if necessary, the bearing 9 can be replaced by removing the bracket 2b from the yoke 2 while the shaft 7 is retained by the rods 16. This improves maintainability of the generator. The configuration of the fourth embodiment can also be applied to the second embodiment to achieve the same effects.

Fifth Embodiment

Figure 14:
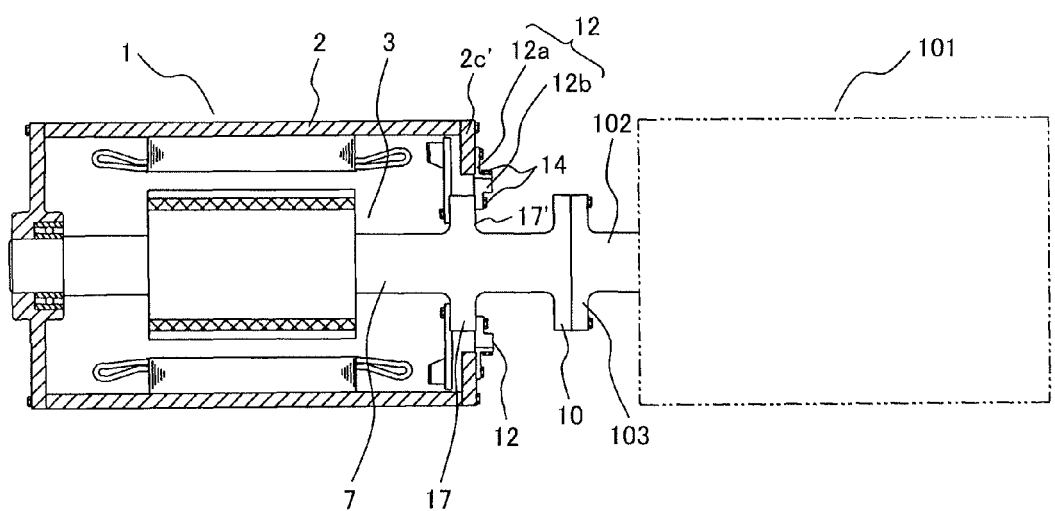
FIG. 14 is a diagram illustrating the permanent magnet type generator for vehicle according to a fifth embodiment in a process of being coupled to a prime mover.

FIG. 14 shows a permanent magnet type generator for vehicle according to a fifth embodiment of the present invention in a state coupled with a prime mover. FIG. 14 shows a state, as in FIG. 12, that the shafts 7 of the generator 1 and the shaft 102 of the prime mover 101 are coupled together via the flanges 10 and 103 in a state immediately before the L-shaped metal parts 12 (12a and 12b) for retaining the rotor 3 are removed therefrom.

Figure 15:
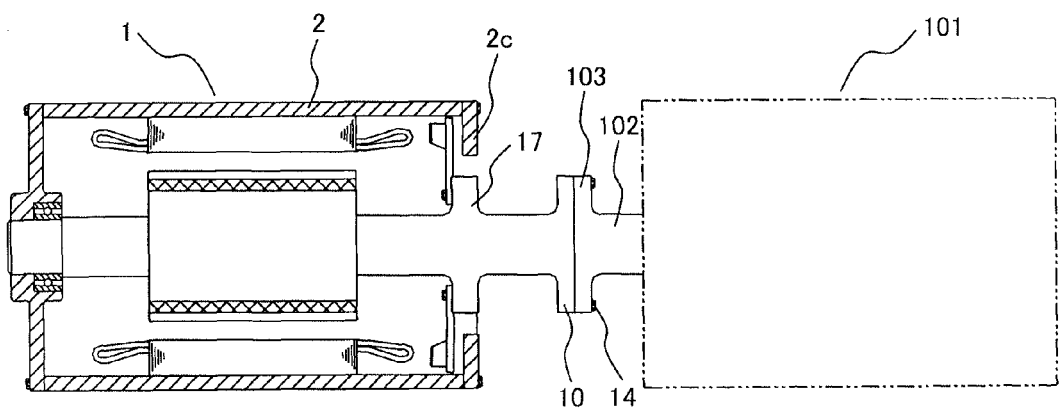
FIG. 15 is a diagram illustrating the permanent magnet type generator for vehicle according to the fifth embodiment in a state having been coupled to a prime mover.

In this embodiment, the generator shaft 7 extends outward beyond the end face 2c' of the generator casing 2. The shaft 7 extending beyond the end face 2c' has a flange portion (a first flange portion) 10 formed at its outer end for coupling with a prime mover and a flange portion (a second flange portion) 17 formed at an intermediate portion thereof for screwing the retaining members thereto. An end face 17' of the second flange portion 17 and the casing end face 2c' are joined together through retaining members 12 (L-shaped metal parts 12a and 12b). The first flange portion 10 of the rotor shaft 7 of the generator of the present embodiment is used solely to couple the generator to the flange 103 of the output shaft 102 of the prime mover 101. This configuration allows the retaining members 12 to be attached to and removed from the generator coupled with the prime mover 101. This improves maintainability of the generator. FIG. 15 shows the generator 1 in a state with the retaining members 12 (L-shaped metal parts 12a and 12b) removed from another flange 17 and the end face 2c' of the generator casing after the flange portion 10 of the rotor shaft 7 is coupled, as shown in FIG. 14, to the flange 103 of the prime mover output shaft 102 using bolts 14.

Sixth Embodiment

Figure 16:
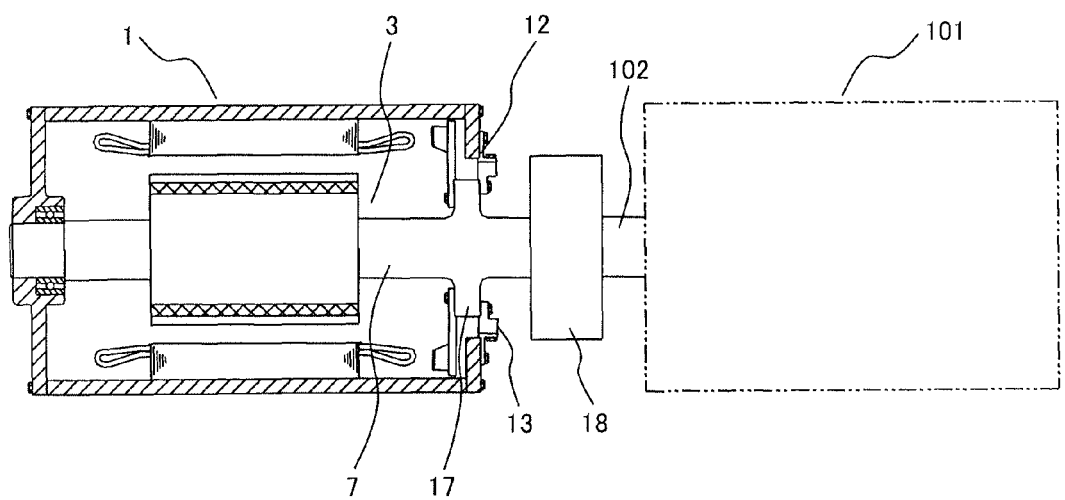
FIG. 16 is a diagram illustrating the permanent magnet type generator for vehicle according to a sixth embodiment in a process of being coupled to a prime mover.

FIG. 16 shows a permanent magnet type generator for vehicle according to a sixth embodiment of the present invention in a state being coupled with a prime mover. In this embodiment, as shown in FIG. 16, the shaft 7 extending from the rotor 3 of the generator 1 and the prime mover 101 are coupled together using a joint-type coupling member 18. FIG. 16 shows a state that the shafts 7 of the generator 1 and the shaft 102 of the prime mover 101 are coupled together via the joint 18 in a state immediately before the retaining members 12 (12a and 12b) for the rotor 3 are removed therefrom. This configuration allows the retaining members 12 (12a and 12b) to be removed from the generator 1 coupled with the prime mover 101. This improves maintainability of the generator. Also, using the joint 18 to couple the rotor shaft 7 of the generator and the output shaft 102 of the prime mover makes it possible to adjust the axial length of each of the generator 1 and the prime mover 101.

Figure 17:
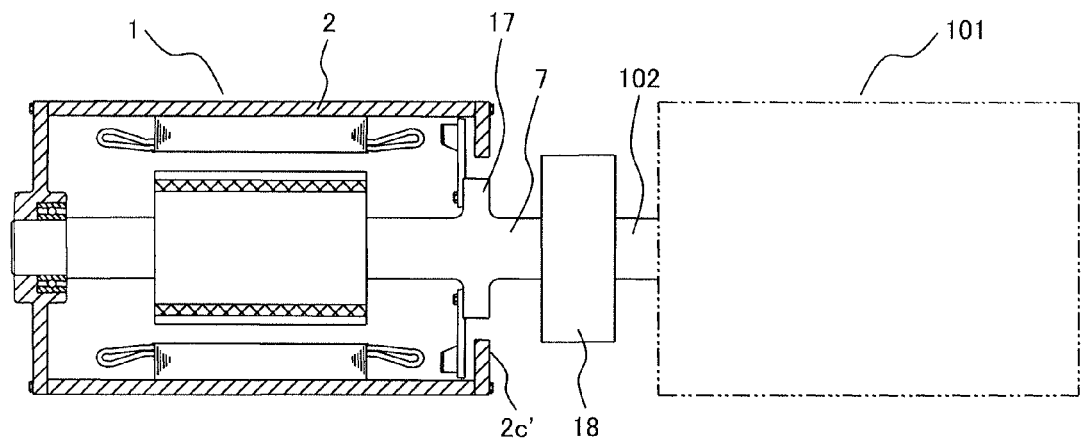
FIG. 17 is a diagram illustrating the permanent magnet type generator for vehicle according to the sixth embodiment in a state having been coupled to a prime mover.

FIG. 17 shows the generator 1 in a state with the retaining members 12 (L-shaped metal parts 12a and 12b) removed from the flange 17 and the end face 2c' of the generator casing after the rotor shaft 7 is coupled, as shown in FIG. 16, to the prime mover output shaft 102 using the joint 18

Seventh Embodiment

Figure 18:
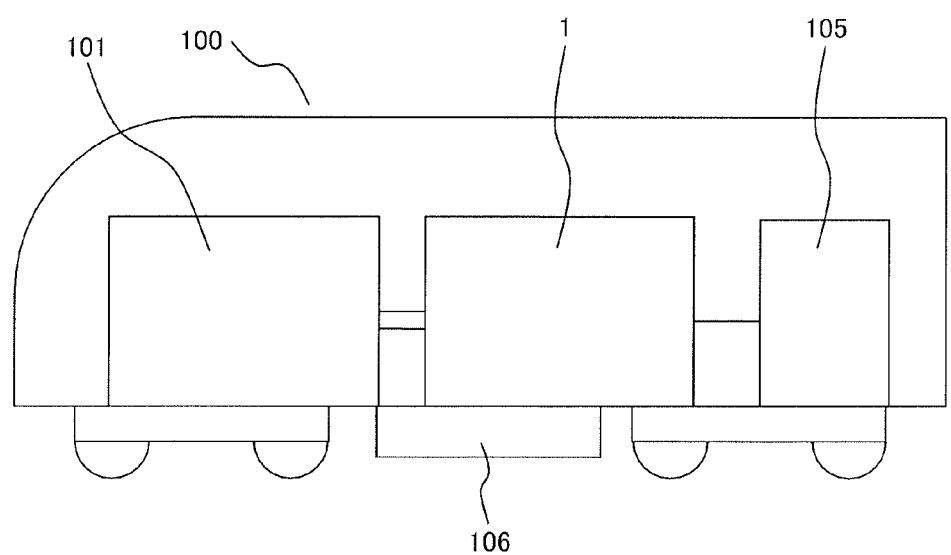
FIG. 18 is a diagram showing an example case in which a permanent magnet type generator for vehicle according to the first to sixth embodiments of the present invention is installed in a rail vehicle.

FIG. 18 shows an example system in which a permanent magnet type generator for vehicle according to the first to sixth embodiments of the present invention is mounted on a rail vehicle. A rail vehicle 100 is equipped with a generator 1 like those described in connection with the first to seventh embodiments, a prime mover 101, a converter 105, and a battery 106. When the prime mover 101 is driven, the generator 1 generates power to charge the battery 106 via the converter 105. According to the present invention, the prime mover 101 is used as a power source, but an alternative power source, for example, a water wheel, wind power, or a turbine is also sufficiently applicable.

DESCRIPTION OF SYMBOLS

1 . . . Generator, 2 . . . Generator casing, 3 . . . Rotor, 4 . . . Stator, 5 . . . Rotor core, 6 . . . Permanent magnet, 7 . . . Rotor shaft, 9 . . . Bearing, 10, 17 . . . Flange portion, 12, 13, 15 . . . Retaining member, 12a, 12b . . . L-shaped metal part, 14 . . . Bolt, 16 . . . Shaft retaining rod, 18 . . . Generator/prime mover coupling joint, Spacer, 100 . . . Rail vehicle, 101 . . . Engine, 102 . . . Output shaft of prime mover, 103 . . . flange, 105 . . . Converter, 106 . . . Battery

The invention claimed is:

1. A permanent magnet type electrical rotating machine comprising:
a stator;
a rotor; and
a casing in which the stator and the rotor are installed,
wherein the rotor is supported in an overhung rotor support structure in which a rotor shaft is supported at only one end side thereof by a bearing provided on one side of the casing,
wherein another end side of the rotor shaft to be a bearing support-free side is capable of coupling to an end of a shaft of a prime mover,
wherein the rotor shaft is configured such that, upon a state of not being coupled to the prime mover shaft, the bearing support-free side is joined to an end face of the casing through a retaining member to be prevented from moving in any of an axial, radial and circumferential directions of the rotor shaft,
wherein there is provided a plurality of the retaining members,
wherein each of the retaining members comprises a pair of L-shaped metal parts joined with each other by a screw member while face-to-face sides of the L-shaped metal parts are butt-joined with the screw member,
wherein each pair of the L-shaped metal parts is joined to the bearing support-free side of the rotor shaft and the end face of the casing with screw members, and
wherein the face-to-face sides of the pair of L-shaped metal parts are provided with respective through-holes for screw member, and the through-hole in either of the pair of the L-shaped metal parts is provided with play to allow the pair of the L-shaped metal parts to be shifted relative to each other in the axial direction of the rotor so as to absorb axial misalignment between L-shaped metal part joined at the rotor shaft and the casing end face.

2. The permanent magnet type electrical rotating machine according to claim 1,
wherein one end side of the retaining member is joined to an end face of the rotor shaft, on the bearing support-free side, with a screw member, and another end side of the retaining member is joined to the end face of the casing with a screw member.

3. The permanent magnet type electrical rotating machine according to claim 1,
wherein the rotor shaft is provided with a flange portion which is integrally formed with the rotor shaft at an end portion of the rotor shaft on the bearing support-free side to be used for coupling the rotor shaft directly to the prime mover shaft, and
wherein one end side of the retaining member is joined to an end face of the flange with a screw member, and another end side of the retaining member is joined to the end face of the casing with a screw member.

4. The permanent magnet type electrical rotating machine according to claim 1,
wherein the rotor shaft is provided with a first flange portion and a second flange portion on the bearing support-free side,
wherein the first flange portion is formed at an end of the rotor shaft to be used for coupling the rotor shaft directly to the prime mover shaft, and the second flange portion is formed for the retaining member, and
wherein one end side of the retaining member is joined to an end face of the second flange portion with a screw member, and another end side of the retaining member is joined to the end face of the casing with a screw member.

5. The permanent magnet type electrical rotating machine according to claim 3,
wherein an end face of the flange portion, which is formed at the end portion of the rotor shaft, is provided with first tapped holes used for coupling the rotor shaft to the prime mover shaft and second tapped holes used for securing one end side of the retaining member to the flange portion with a screw member.

6. The permanent magnet type electrical rotating machine according to claim 1,
wherein the through-hole for screw member in either of the pair of the L-shaped metal parts is provided with the play by having a larger diameter than the screw member to be inserted therethrough or an elongated shape in the axial direction of the rotor.

7. The permanent magnet type electrical rotating machine according to claim 1, further comprising a plurality of shaft retaining rods each having a male thread, and the shaft retaining rods being inserted from an outer periphery of the casing toward the rotor shaft on the bearing support-free side through tapped holes formed in the casing,
wherein the shaft retaining rods are configured to retain the rotor shaft while catching the rotor shaft together, so that a supplemental restraint for the rotor shaft is made in any of radial, axial, and circumferential directions of the rotor shaft.

8. The permanent magnet type electrical rotating machine according to claim 2, further comprising a plurality of shaft retaining rods each having a male thread, and the shaft retaining rods being inserted from an outer periphery of the casing toward the rotor shaft on the bearing support-free side through tapped holes formed in the casing,
wherein the shaft retaining rods are configured to retain the rotor shaft while catching the rotor shaft together, so that a supplemental restraint for the rotor shaft is made in any of radial, axial, and circumferential directions of the rotor shaft.

9. The permanent magnet type electrical rotating machine according to claim 3, further comprising a plurality of shaft retaining rods each having a male thread, and the shaft retaining rods being inserted from an outer periphery of the casing toward the rotor shaft on the bearing support-free side through tapped holes formed in the casing,
wherein the shaft retaining rods are configured to retain the rotor shaft while catching the rotor shaft together, so that a supplemental restraint for the rotor shaft is made in any of radial, axial, and circumferential directions of the rotor shaft.

10. The permanent magnet type electrical rotating machine according to claim 4, further comprising a plurality of shaft retaining rods each having a male thread, and the shaft retaining rods being inserted from an outer periphery of the casing toward the rotor shaft on the bearing support-free side through tapped holes formed in the casing,
wherein the shaft retaining rods are configured to retain the rotor shaft while catching the rotor shaft together, so that a supplemental restraint for the rotor shaft is made in any of radial, axial, and circumferential directions of the rotor shaft.

11. The permanent magnet type electrical rotating machine according to claim 5, further comprising a plurality of shaft retaining rods each having a male thread, and the shaft retaining rods being inserted from an outer periphery of the casing toward the rotor shaft on the bearing support-free side through tapped holes formed in the casing,
wherein the shaft retaining rods are configured to retain the rotor shaft while catching the rotor shaft together, so that a supplemental restraint for the rotor shaft is made in any of radial, axial, and circumferential directions of the rotor shaft.

12. The permanent magnet type electrical rotating machine according to claim 6, further comprising a plurality of shaft retaining rods each having a male thread, and the shaft retaining rods being inserted from an outer periphery of the casing toward the rotor shaft on the bearing support-free side through tapped holes formed in the casing,
wherein the shaft retaining rods are configured to retain the rotor shaft while catching the rotor shaft together, so that a supplemental restraint for the rotor shaft is made in any of radial, axial, and circumferential directions of the rotor shaft.

13. A permanent magnet type electrical rotating machine system for vehicle, comprising:
a rail vehicle; and
a permanent magnet type electrical rotating machine according to claim 1 that is mounted on the rail vehicle such that a rotor of the rotating machine is directly coupled to a prime mover for the rail vehicle upon a state of removing the retaining member from the rotating machine,
wherein the permanent magnet type electrical rotating machine has the overhung rotor support structure.

14. A permanent magnet type electrical rotating machine system for vehicle, comprising
a rail vehicle; and
a permanent magnet type electrical rotating machine according to claim 2 that is mounted on the rail vehicle such that a rotor of the rotating machine is directly coupled to a prime mover for the rail vehicle upon a state of removing a retaining member from the rotating machine
wherein the permanent magnet type electrical rotating machine has the overhung rotor support structure.

15. A permanent magnet type electrical rotating machine comprising:
a stator;
a rotor; and
a casing in which the stator and the rotor are installed,
wherein the rotor is supported in an overhung rotor support structure in which a rotor shaft is supported at only one end side thereof by a bearing provided on one side of the casing,
wherein another end side of the rotor shaft to be a bearing support-free side is capable of coupling to an end of a shaft of a prime mover,
wherein the rotor shaft is configured such that, in a state of not being coupled to a prime mover shaft, the bearing support-free side is joined to an end face of the casing through a retaining member to be prevented from moving in any of axial, radial and circumferential directions of the rotor shaft,
wherein the rotor shaft is provided with a flange portion which is integrally formed with the rotor shaft at an end portion of the rotor shaft on the bearing support-free side to be used for coupling the rotor shaft directly to the prime mover shaft,
wherein one end side of the retaining member is joined to an end face of the flange portion with a screw member, and another end side of the retaining member is joined to the end face of the casing with a screw member,
wherein an end face of the flange portion, which is formed at the end portion of the rotor shaft, is provided with first tapped holes used for coupling the rotor shaft to the prime mover shaft and second tapped holes used for securing one end side of the retaining member to the flange portion with a screw member,
wherein the permanent magnet type electrical rotating machine further comprises a plurality of shaft retaining rods each having a male thread, the shaft retaining rods being inserted from an outer periphery of the casing toward the rotor shaft on the bearing support-free side through third tapped holes formed in the casing, and wherein the shaft retaining rods are configured to retain the rotor shaft while catching the rotor shaft together, so that a supplemental restraint for the rotor shaft is made in any of the radial, axial, and circumferential directions of the rotor shaft.

16. A permanent magnet type electrical rotating machine system for vehicle, comprising:

a rail vehicle; and a permanent magnet type electrical rotating machine according to claim 15 that is mounted on the rail vehicle such that a rotor of the rotating machine is directly coupled to a prime mover for the rail vehicle upon a state of removing the retaining member from the rotating machine, wherein the permanent magnet type electrical rotating machine has the overhung rotor support structure.

* * * * *